United States Patent [19]

Orii

[11] Patent Number: 5,106,258
[45] Date of Patent: Apr. 21, 1992

[54] WORKPIECE TRANSFER APPARATUS EFFECTING VERTICAL AND HORIZONTAL MOTION

[75] Inventor: Masaru Orii, Machida, Japan

[73] Assignee: Kabushikikaisha Orii, Kanagawa, Japan

[21] Appl. No.: 552,128

[22] Filed: Jul. 13, 1990

[30] Foreign Application Priority Data

Nov. 30, 1989 [JP] Japan .................. 1-309391

[51] Int. Cl.$^5$ .............................................. B65G 47/91
[52] U.S. Cl. ................................... 414/733; 414/735; 414/752; 901/15; 901/40
[58] Field of Search ............. 414/729, 730, 732, 733, 414/735, 737, 749, 750, 751, 752, 783, 917, 222; 901/6, 14, 15, 21, 40

[56] References Cited

U.S. PATENT DOCUMENTS

| | | | |
|---|---|---|---|
| 3,010,587 | 11/1961 | Hollinger | 901/40 X |
| 3,561,614 | 2/1971 | Tezuka et al. | 901/15 X |
| 3,630,389 | 12/1971 | Schmidt et al. | 901/40 X |
| 3,991,885 | 11/1976 | Warren | 414/739 X |
| 4,299,533 | 10/1981 | Ohnaka | 414/752 |
| 4,487,409 | 12/1984 | Orii | 414/752 X |
| 4,492,510 | 1/1985 | Tanii et al. | 414/733 |
| 4,787,813 | 11/1988 | Stevens et al. | 901/21 X |
| 4,964,776 | 10/1990 | Wakita et al. | 414/751 X |

FOREIGN PATENT DOCUMENTS

| | | |
|---|---|---|
| 2802738 | 7/1979 | Denmark . |
| 3525988 | 1/1987 | Denmark . |
| 0114774 | 1/1984 | European Pat. Off. . |
| 3326962 | 2/1985 | Fed. Rep. of Germany .......... 901/21 |
| 2346071 | 10/1977 | France . |
| 55-55886 | 12/1980 | Japan . |
| 59-17593 | 5/1984 | Japan . |
| 61-172627 | 10/1986 | Japan . |
| 62-81230 | 4/1987 | Japan . |
| 0145930 | 6/1989 | Japan .................................. 901/40 |
| 0065978 | 3/1990 | Japan .................................. 901/15 |
| 8606673 | 11/1986 | World Int. Prop. O. ............. 901/21 |

*Primary Examiner*—Frank E. Werner
*Assistant Examiner*—James Eller
*Attorney, Agent, or Firm*—Fish & Richardson

[57] ABSTRACT

A workpiece transfer apparatus includes a first arm mounted at its lower end on a base for angular movement about a first angular movement axis extending substantially horizontally. A second arm is mounted at its upper end on an upper end of the first arm for angular movement about a second angular movement axis parallel to the first angular movement axis. The first arm is longer than the second arm. The apparatus further comprises a holder device for releaseably holding a workpiece. The holder device is mounted on a lower end of the second arm. The holder device and the first arm are disposed respectively on the opposite sides of the second arm spaced from each other in the direction of the first and second angular movement axes, so that the holder device, when moving horizontally, does not interfere with the first arm. The first and second arms are angularly moved respectively by first and second drive devices.

7 Claims, 5 Drawing Sheets

WORKPIECE TRANSFER APPARATUS EFFECTING VERTICAL AND HORIZONTAL MOTION

BACKGROUND OF THE INVENTION

This invention relates to a workpiece transfer apparatus for transferring a workpiece, for example, from one of two adjacent pressing machines to the other.

A workpiece transfer apparatus of the type heretofore extensively used is disclosed, for example, in Japanese Laid-Open (Kokai) Utility Model Application No. 172627/86 and Japanese Utility Model Publication No. 55886/80. Such a conventional apparatus comprises a base, a first guide rail mounted on the base and extending vertically, a first slider mounted on the first guide rail for vertical movement, a second guide rail fixedly mounted on the first slider and extending horizontally, a second slider extending horizontally and movable horizontally along the second guide rail, and a plurality of suction devices mounted on the second slider. In this conventional apparatus, a table is provided between pressing machines. The vertical movement of the suction devices is effected by the vertical movement of the first slider, and the horizontal movement of the suction devices is effected by the horizontal movement of the second slider. One suction device moves horizontally toward one pressing machine from a basic position disposed between the pressing machines, and then descends to hold a workpiece, placed on a lower die of the one pressing machine, by suction, and then ascends, and then moves horizontally toward the table, and then descends to place the workpiece on the table. During this time, the other suction device holds another workpiece, placed on the table, by suction, and then places this workpiece on a lower die of the other pressing machine.

In the above workpiece transfer apparatus provided with the vertically movable slider and the horizontally movable slider, the workpiece remains unchanged in posture, that is, remains horizontal.

Recently, there have been required various pressing operations one example of which is to invert the workpiece removed from one pressing machine and then to press it. It is difficult for the above conventional apparatus to meet such requirement.

To meet such requirement, there has been proposed a workpiece transfer apparatus disclosed, for example, in Japanese Laid-Open Patent Application No. 81230/87. This apparatus comprises a vertically-extending guide rail mounted on a side surface of a pressing machine, a slider mounted on this guide rail for vertical movement, an arm angularly movably connected at one end to the slider, and a suction device angularly movably mounted on the other or distal end of the arm. The arm is angularly movable about a horizontal axis and also about a vertical axis. One thing to note here is that the apparatus is provided with only one arm, and that the transfer of the suction device is effected by the angular movement of this arm. The vertical movement of the suction device is effected by the vertical movement of the slider.

In the apparatus of the above Japanese Laid-Open Patent Application No. 81230/87, the transfer of the workpiece depends solely on the angular movement of the single arm mounted on the pressing machine via the slider, and therefore the distance of transfer can not be increased.

A workpiece transfer apparatus disclosed in Japanese Utility Model Publication No. 17593/84 comprises a base, a first arm mounted on the base for angular movement about a first angular movement axis, a second arm mounted at its upper end on an upper end of the first arm for angular movement about a second angular movement axis, and a suction device mounted on a lower end of the second arm for angular movement about a third angular movement axis. The first to third angular movement axes are disposed horizontally and are parallel to one another. The effective length of the first arm extending between the first and second angular movement axes is equal to the effective length of the second arm extending between the second and third angular movement axes. The suction device extends in a direction perpendicular to the third angular movement axis. This apparatus is provided with a single drive means. When the first arm is angularly moved through an angle $\theta$ by this drive means, for example, in a clockwise direction, the second arm is angularly moved relative to the first arm in a counterclockwise direction through an angle of $2\theta$ via a power transmitting mechanism, so that the suction device is moved horizontally. At this time, the suction device is angularly moved relative to the second arm in a clockwise direction through an angle of $\theta$ via another power transmitting mechanism, and therefore the suction device is maintained in a horizontal condition.

In the workpiece transfer apparatus of the above Japanese Utility Model Publication No. 17593/84, there is not provided the function of vertically moving the suction device, and therefore it is almost impossible to hold and remove the workpiece by the suction device. The suction device extends in the direction perpendicular to the third angular movement axis, and therefore during the time when the suction device is inserted between upper and lower dies of one of the two pressing machines, the distal end of the second arm is also inserted between these upper and lower dies. Therefore, it is necessary to increase the distance between the two dies.

SUMMARY OF THE INVENTION

It is an object of this invention to provide a workpiece transfer apparatus in which horizontal and vertical movements of a workpiece can be effected, and a suction device can be inserted into a narrow space between upper and lower dies of a pressing machine so as to remove and set the workpiece, and the distance of transfer of the workpiece can be increased with a relatively compact construction of the apparatus.

According to the present invention, there is provided a workpiece transfer apparatus comprising:
 (a) a base;
 (b) a first arm mounted at its lower end on the base for angular movement about a first angular movement axis extending substantially horizontally;
 (c) a second arm mounted at its upper end on an upper end of the first arm for angular movement about a second angular movement axis, the second arm being shorter than the first arm, and the second angular movement axis being parallel to the first angular movement axis;
 (d) holder means for releaseably holding a workpiece, the holder means being mounted on a lower end of the second arm, the holder means and the first arm being disposed respectively on opposite sides of the second arm spaced from each other in the direction of the first and second angular movement axes; and (e) first and second drive means for angularly moving the first and second arms, respectively.

DESCRIPTION OF THE PREFERRED EMBODIMENT OF THE INVENTION

One preferred embodiment of the present invention will now be described with reference to the drawings.

Figure 1:
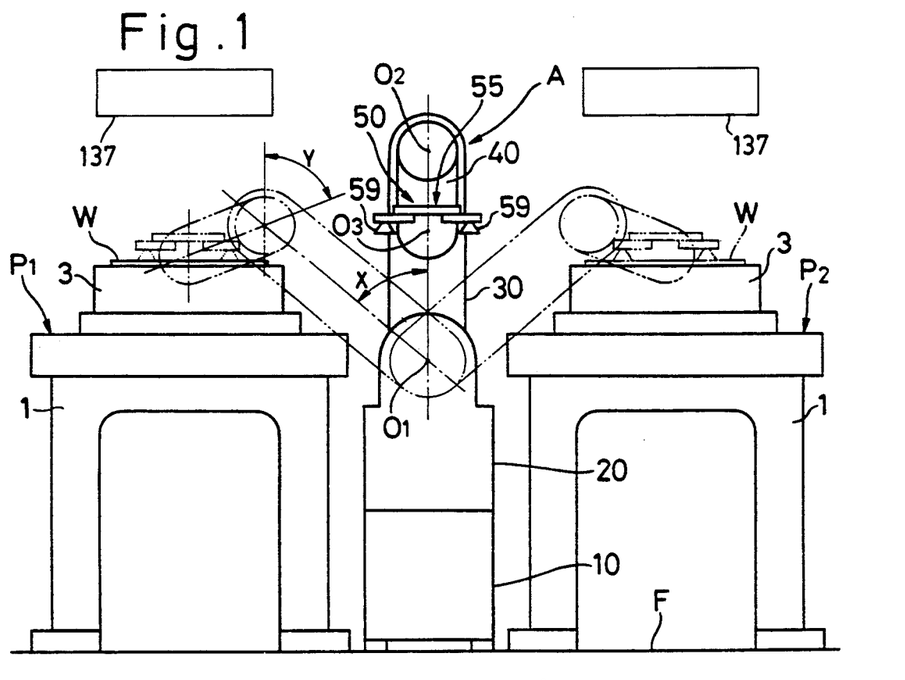
FIG. 1 is a front-elevational view of a transfer system including a workpiece transfer apparatus of the present invention and two pressing machines.
Figure 2:
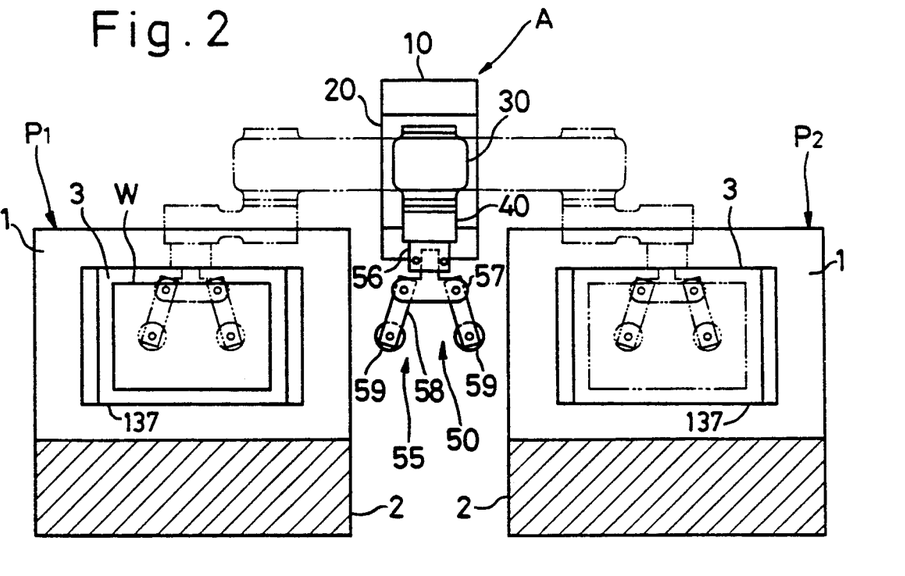
FIG. 2 is a plan view of the transfer system.

As shown in FIGS. 1 and 2, a workpiece transfer apparatus A is disposed in the middle between two adjacent pressing machines P1 and P2, and the front of this apparatus A is directed toward the fronts of the two pressing machines. The workpiece transfer apparatus A is used to transfer a workpiece W from one pressing machine P1 to the other pressing machine P2. Each of the pressing machines P1 and P2 comprises a lower frame portion 1, a vertical frame portion 2 extending upwardly from the rear of the lower frame portion 1, and an upper frame portion (not shown) extending forwardly (i.e., toward the workpiece transfer apparatus A) from the vertical frame portion 2. A lower die 3 is fixedly mounted on the upper surface of the lower frame portion 1. An upper die 137 is mounted on the upper frame portion for vertical movement.

Figure 3:
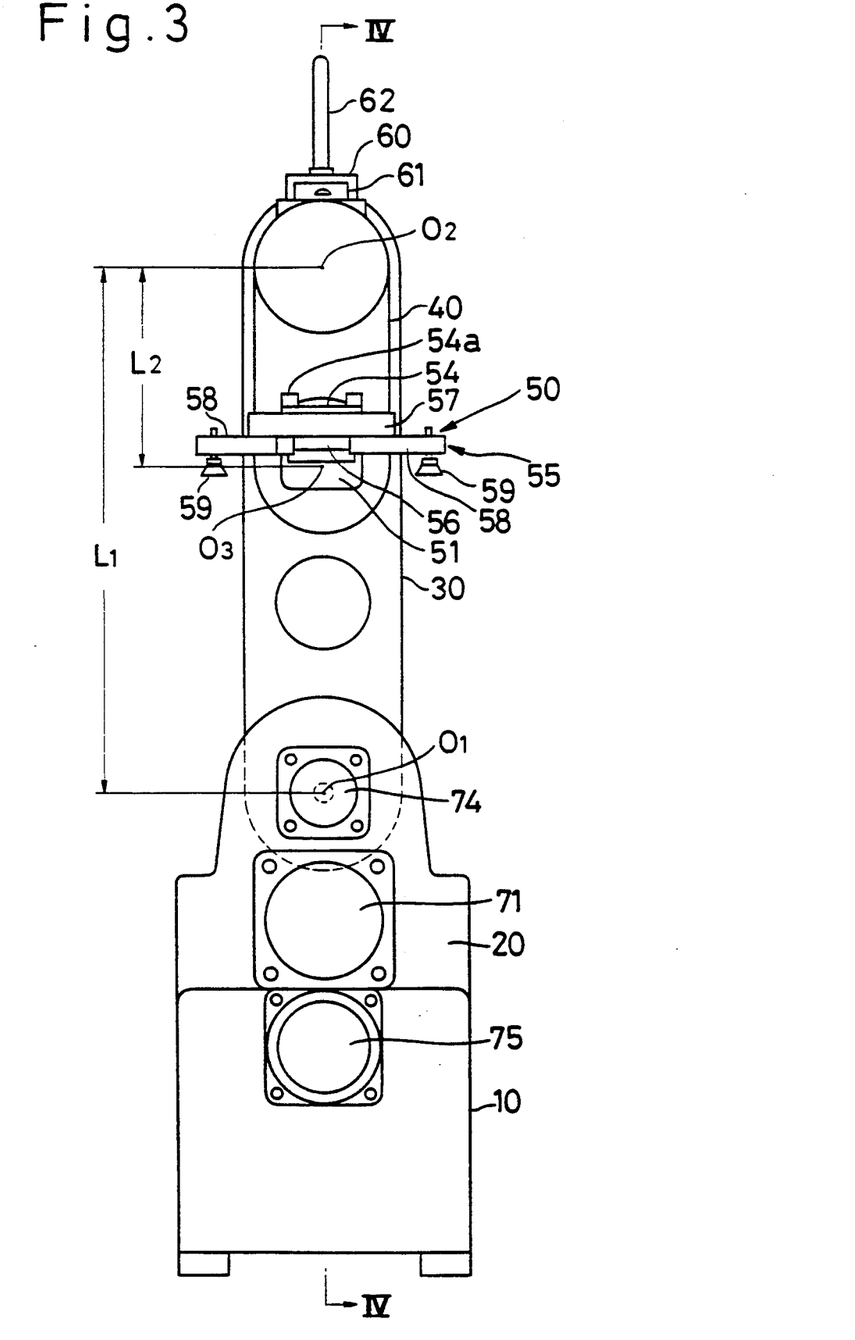
FIG. 3 is an enlarged front-elevational view of the workpiece transfer apparatus.

A general construction of the workpiece transfer apparatus A will now be described with reference to FIGS. 1 to 3. The workpiece transfer apparatus A comprises a fixed bed 10 fixedly mounted on a floor F and disposed in the middle between the two pressing machines P1 and P2. The fixed bed 10 is disposed generally on the front side of the pressing machines P1 and P2, and is elongated in the forward/backward direction, that is, in a direction perpendicular to the direction of juxtaposition of the two pressing machines P1 and P2. The workpiece transfer apparatus A further comprises a base 20 mounted on the fixed bed 10 for movement in a direction perpendicular to the direction of juxtaposition of the two pressing machines P1 and P2, a first arm 30 mounted at its lower end on the base 20 for angular movement about a first angular movement axis 01, a second arm 40 mounted at its upper end on the upper end of the first arm 30 for pivotal movement about a second angular movement axis 02, and a holder mechanism 50 mounted on the lower end of the second arm 40 for angular movement about a third angular movement axis 03, the holder mechanism 50 serving to hold the workpiece W. The first, second and third angular movement axes 01, 02 and 03 extend horizontally, and are disposed perpendicular to the direction of juxtaposition of the two pressing machines P1 and P2, and also are disposed parallel to one another. The effective length L1 of the first arm 30 for the transfer of the workpiece W is determined by the distance between the first and second angular movement axes 01 and 02 at the first arm 30. The effective length L2 of the second arm 40 is determined by the distance between the second and third angular movement axes 02 and 03 at the second arm 40. The effective length L1 of the first arm 30 is more than twice greater than the effective length L2 of the second arm 40.

As shown in FIG. 2, the second arm 40 is disposed forwardly of the first arm 30 (that is, disposed closer to the pressing machines P1 and P2 than the first arm 30) in the direction of the second angular movement axis 02. The holder mechanism 50 is disposed forwardly of the second arm 40, that is, disposed on that side of the second arm 40 facing away from the first arm 30.

Figure 4:
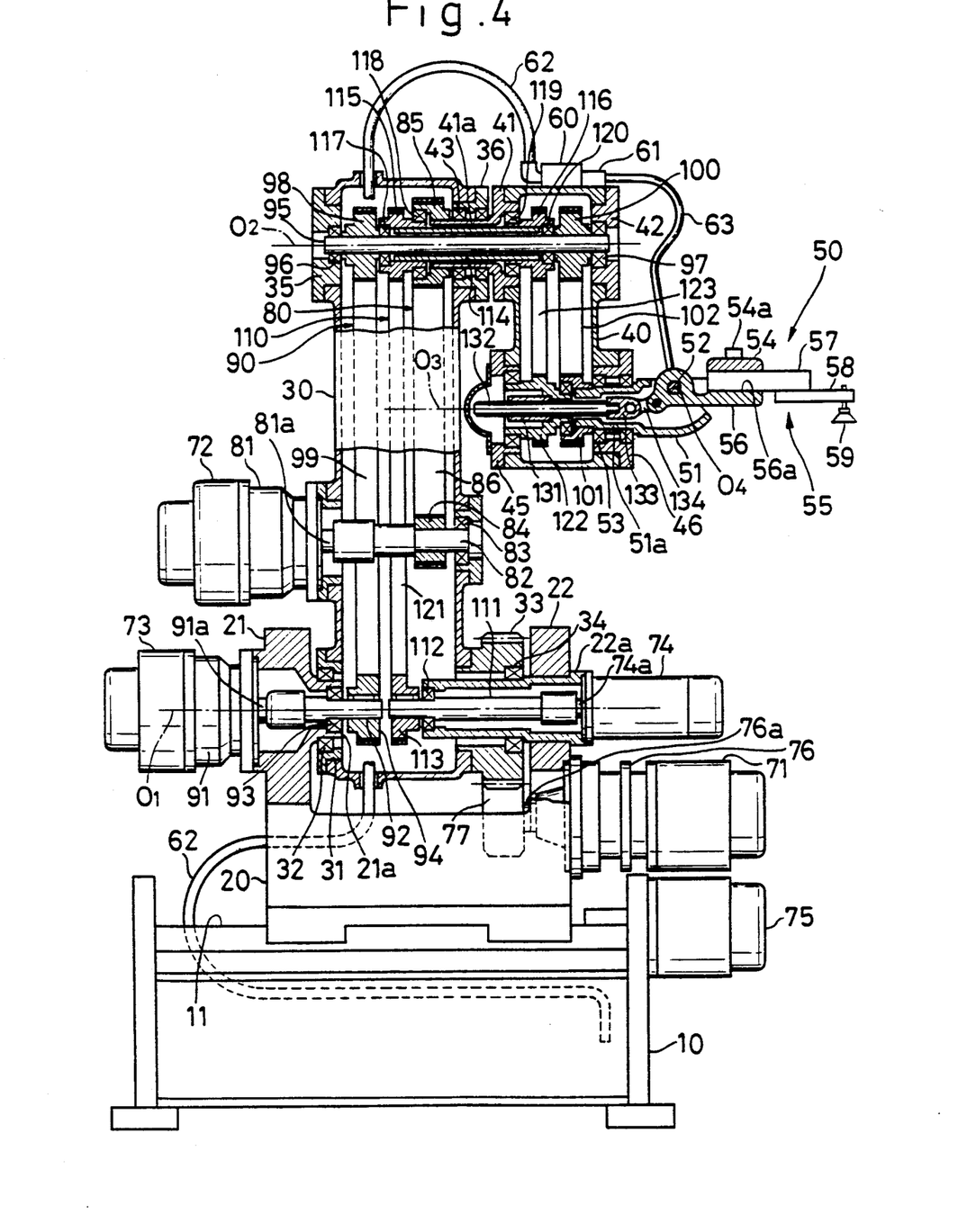
FIG. 4 is a vertical cross-sectional view of the workpiece transfer apparatus taken along the line IV—IV of FIG. 3.

A detailed construction of the workpiece transfer apparatus A will now be described with particular reference to FIGS. 4 and 5. Two horizontally-extending guide rails 11 (only one of which is shown) are provided on and extend along the length of the fixed bed 10. The base 20 is mounted on the guide rails 11 for movement therealong.

The base 20 has a pair of opposed rear and front walls 21 and 22 extending upwardly. The rear wall 21 has a tubular portion 21a, and a tubular member 22a extends through and is fixedly secured to the front wall 22. The axes of the tubular portion 21a and the tubular member 22a are in alignment with the first angular movement axis 01.

The first arm 30 is hollow, and has a square cross-section, and a tubular member 31 extends through and is fixedly secured to a rear wall of the first arm 30 at the lower end portion thereof, the tubular member 31 being coaxial with the tubular portion 21a of the base 20. A bearing 32 is interposed between the tubular portion 21a and the tubular member 31. A ring-shaped gear 33 is fixedly secured to a front wall of the first arm 30 at the lower end portion thereof, the gear 33 being coaxial with the tubular member 22a. A bearing 34 is interposed between the gear 33 and the tubular member 22a. With this construction, the first arm 30 is supported on the base 20 for angular movement about the first angular movement axis 01.

Tubular members 35 and 36 respectively extend through and are fixedly secured to the rear and front walls of the first arm 30 at the upper end portion thereof. The axes of the tubular members 35 and 36 are in alignment with the second angular movement axis 02.

The second arm 40 is also hollow, and has a square cross-section. Tubular members 41 and 42 respectively extend through and are fixedly secured to rear and front walls of the second arm 40 at the upper end portion thereof. The axes of the tubular members 41 and 42 are in alignment with the second angular movement axis 02. The tubular member 41 secured to the rear wall of the second arm 40 has a smaller-diameter portion 41a extending toward the first arm 30. The smaller-diameter portion 41a passes through the tubular member 36 secured to the front wall of the first arm 30, and extends into the first arm 30. Through the agency of bearings 43 interposed between the smaller-diameter portion 41a of the tubular member 41 and the tubular member 36, the second arm 40 is supported on the first arm 30 for angular movement about the second angular movement axis 02.

Tubular members 45 and 46 respectively extend through and are fixedly secured to the rear and front walls of the second arm 40 at the lower end portion thereof. The axes of the tubular members 45 and 46 are in alignment with the third angular movement axis 03.

The holder mechanism 50 will now be described in detail. The holder mechanism 50 comprises a hollow support member 51. The support member 51 has a cylindrical portion 51a coaxial with the tubular member 46, and the support member 51 is supported on the second arm 40 via bearings 53, interposed between the cylindrical portion 51a and the tubular member 46, so as to be angularly moved about the third angular movement axis 03. The support member 51 projects from the front wall of the second arm 40 forwardly, that is, in a direction away from the first arm 30.

The holder mechanism 50 further comprises a suction device 55. The suction device 55 comprises an elongated frame 56 which is pivotally connected at its rear end to the projected end of the support member 51 by a pin 52. The axis of the pin 52 serves as a fourth angular movement axis 04, and this fourth angular movement axis 04 is disposed perpendicular to the third angular movement axis 03, and is disposed above the third angular movement axis 03. With this construction, the suction device 55 is supported on the support member 51 for angular movement about the fourth angular movement axis 04. The frame 56 extends in the same direction as the direction of extending of the support member 51, and projects beyond the distal end of the support member 51. A holder groove 56a of a channel-shaped cross-section is formed in the upper surface of the projected end of the frame 56, and extends in the same direction as the direction of projecting of this projected end. A base portion (one leg portion) of a T-shaped frame 57 is received in the holder groove 56a, and is held by a retainer plate 54 against disengagement from the holder groove 56a. More specifically, the retainer plate 54 is fixedly secured to the frame 56 by bolts 54a threaded through the retainer plate 54 into the frame 56. A pair of frames 58 are fixedly secured at their one ends to the opposite ends of the other leg portion of the T-shaped frame 57. Suction pads or cups 59 directed downward are mounted on the distal ends of the two frames 58, respectively. The lower end of each suction pad 59 is disposed slightly below the third angular movement axis 03, but it can be said that they are generally at the same level.

A vacuum generator 60 and a change valve (cut-off valve) 61 are mounted on the upper wall of the second arm 40. The vacuum generator 60 is connected to a high-pressure air source (not shown) via a tube 62 extending through the first arm 30, and produces vacuum utilizing high-pressure air in the well known manner. The change valve 61 is connected to the suction pads 59 via a tube 63, passages formed in the frames 56 and 57, and other tubes (not shown). Each suction pad 59 is switched by the change valve 61 between an operative condition in which vacuum is applied from the vacuum generator 60 to the suction pad 59 and an inoperative condition in which the suction pad 59 is open to the atmosphere.

The workpiece transfer apparatus A comprises a first servomotor (first drive means) 71 for angularly moving the first arm 30, a second servomotor (second drive means) 72 for angularly moving the second arm 40, a third servomotor (third drive means) 73 for angularly moving the support member 51 of the holder mechanism 50 about the third angular movement axis 03, a fourth servomotor (fourth drive means) 74 for angularly moving the suction device 55 of the holder mechanism 50 about the fourth angular movement axis 04, and a fifth servomotor (fifth drive means) 75 for moving the base 20 forward and backward relative to the fixed bed 20. Each of the servomotors 71 to 75 has a brake mechanism (not shown) by which the associated member can be kept stopped at a desired position.

First, the fifth servomotor 75 will now be described. The fifth servomotor 75 is fixedly mounted on the fixed bed 10, and the rotation of the fifth servomotor 75 is transmitted to the base 20 via a ball thread mechanism (not shown), thereby moving the base 20 forward and backward.

The first servomotor 71 is fixedly mounted on the front wall 22 of the base 20 via a speed reducer 76, and a gear 77 is fixedly mounted on an output shaft 76a of the speed reducer 76. The gear 77 is in mesh with the gear 33 fixedly secured to the lower end of the first arm 30. The rotation of the first servomotor 71 is transmitted to the first arm 30 via the speed reducer 76 and the gears 77 and 33, thereby angularly moving the first arm 30 about the first angular movement axis 01.

Next, a power transmitting means 80 for transmitting the rotation of the second servomotor 72 to the second arm 40 will now be described. The second servomotor 72 is fixedly mounted via a speed reducer 81 on the rear wall of the first arm 30 intermediate the opposite ends thereof. An auxiliary transmitting shaft 82 mounted within the first arm 30 is connected at one end to an output shaft 81a of the speed reducer 81. The other end of the auxiliary transmitting shaft 82 is rotatably supported on the front wall of the first arm 30 via a bearing 83. The output shaft 81a and the auxiliary transmitting shaft 82 are coaxial with each other, and are parallel to the angular movement axes 01 to 03. A timing pulley (toothed pulley) 84 is fixedly mounted on the auxiliary transmitting shaft 82. The tubular member 41 fixedly mounted on the upper end of the second arm 40 serves as a first transmitting shaft. A timing pulley 85 is fixedly mounted on the distal end of the smaller-diameter portion 41a of the first transmitting shaft 41. A timing belt 86 is extended around the two timing pulleys 84 and 85.

As is clear from the foregoing, the power transmitting means 80 for transmitting the rotation of the second servomotor 72 to the second arm 40 comprises the speed reducer 81, the auxiliary transmitting shaft 82, the first transmitting shaft 41, the timing pulleys 84 and 85, and the timing belt 86. All of these parts except for the speed reducer 81 are received within the first arm 30.

Next, a power transmitting means 90 for transmitting the rotation of the third servomotor 73 to the support member 51 of the holder mechanism 50 will now be described. The third servomotor 73 is fixedly mounted on the rear wall 21 of the base 20 via a speed reducer 91. An auxiliary transmitting shaft 92 is connected at one end to an output shaft 91a of the speed reducer 91. The auxiliary transmitting shaft 92 is rotatably supported on the rear wall 21 of the base 20 via a bearing 93. The axes of the output shaft 91a and the auxiliary transmitting shaft 92 are in alignment with the first angular movement axis 01. The other end of the auxiliary transmitting shaft 92 is disposed within the first arm 30, and a timing pulley 94 is fixedly mounted on the other end of this shaft 92. A second transmitting shaft 95 is passed coaxially through the first transmitting shaft 41 with a gap therebetween. One end portion of the second transmitting shaft 95 is rotatably supported on the upper end portion of the rear wall of the first arm 30 via a bearing 96 whereas the other end portion is rotatably supported on the upper end portion of the front wall of the second arm 40 via a bearing 97. A timing pulley 98 corresponding to the timing pulley 94 is fixedly mounted on the one end portion of the second transmitting shaft 95 disposed in the first arm 30, and a timing belt 99 is extended around these two timing pulleys 94 and 98. A timing pulley 100 is fixedly mounted on the other end portion of the second transmitting shaft 95 disposed in the second arm 40. A timing pulley 101 corresponding to the timing pulley 100 is also fixedly mounted on the proximal end of the support member 51 of the holder mechanism 50, and a timing belt 102 is extended around these two timing pulleys 100 and 101.

As described above, the power transmitting means 90, operatively connecting the third servomotor 73 to the support member 51 of the holder mechanism 50, comprises the speed reducer 91, the auxiliary transmitting shaft 92, the second transmitting shaft 95, the timing pulleys 94, 98, 100 and 101, and the timing belts 99 and 102. These parts are received substantially within the first and second arms 30 and 40.

The timing pulleys 94 and 98 have the same diameter and the same number of teeth. Also, the timing pulleys 100 and 101 have the same diameter and the same number of teeth. Therefore, the auxiliary transmitting shaft 92 and the support member 51 are angularly moved at the same speed.

Next, a power transmitting means 110 for transmitting the rotation of the fourth servomotor 74 to the suction device 55 will now be described. The fourth servomotor 74 is fixedly mounted on the tubular member 22a secured to the front wall 22 of the base 20. An auxiliary transmitting shaft 111 coaxial with the first angular movement axis 01 is connected to an output shaft 74a of the fourth servomotor 74. The auxiliary transmitting shaft 111 is rotatably supported on the distal end of the tubular member 22a via a bearing 112. A timing pulley 113 is fixedly mounted on one end of the auxiliary transmitting shaft 111 extending into the first arm 30. At the upper end portions of the first and second arms 30 and 40, a third transmitting shaft 114 of a tubular shape is received between the first transmitting shaft 41 and the second transmitting shaft 95, the shaft 114 being coaxial with the shafts 41 and 95. A timing pulley 15 is fixedly mounted on one end of the third transmitting shaft 114 disposed in the first arm 30, and a timing pulley 116 is fixedly mounted on the other end of the third transmitting shaft 114 disposed in the second arm 40. A bearing 117 is interposed between the one end of the timing pulley 115 and the second transmitting shaft 95, and a bearing 118 is interposed between the other end of the timing pulley 115 and the timing pulley 85. A bearing 119 is interposed between one end of the timing pulley 116 and the tubular member 41, and a bearing 120 is interposed between the other end of the timing pulley 116 and the second transmitting shaft 95. With this arrangement, the third transmitting shaft 114 is supported for angular movement about its axis. A timing belt 121 is extended around the timing pulley 115, fixedly mounted on the third transmitting shaft 114, and the timing pulley 113 disposed at the lower end portion of the first arm 30. A timing belt 123 is extended around the timing pulley 116, fixedly mounted on the third transmitting shaft 114, and a timing pulley 122 disposed at the lower end portion of the second arm 40. As best shown in FIG. 5, the axis of the timing pulley 122 is in alignment with the third angular movement axis 03, and one end of the timing pulley 122 is rotatably supported via a bearing 124 on the tubular member 45 fixedly mounted on the lower end portion of the second arm 40. The other end of the timing pulley 122 is formed into a smaller diameter, and is rotatably supported on the timing pulley 101 via a bearing 125.

Figure 5:
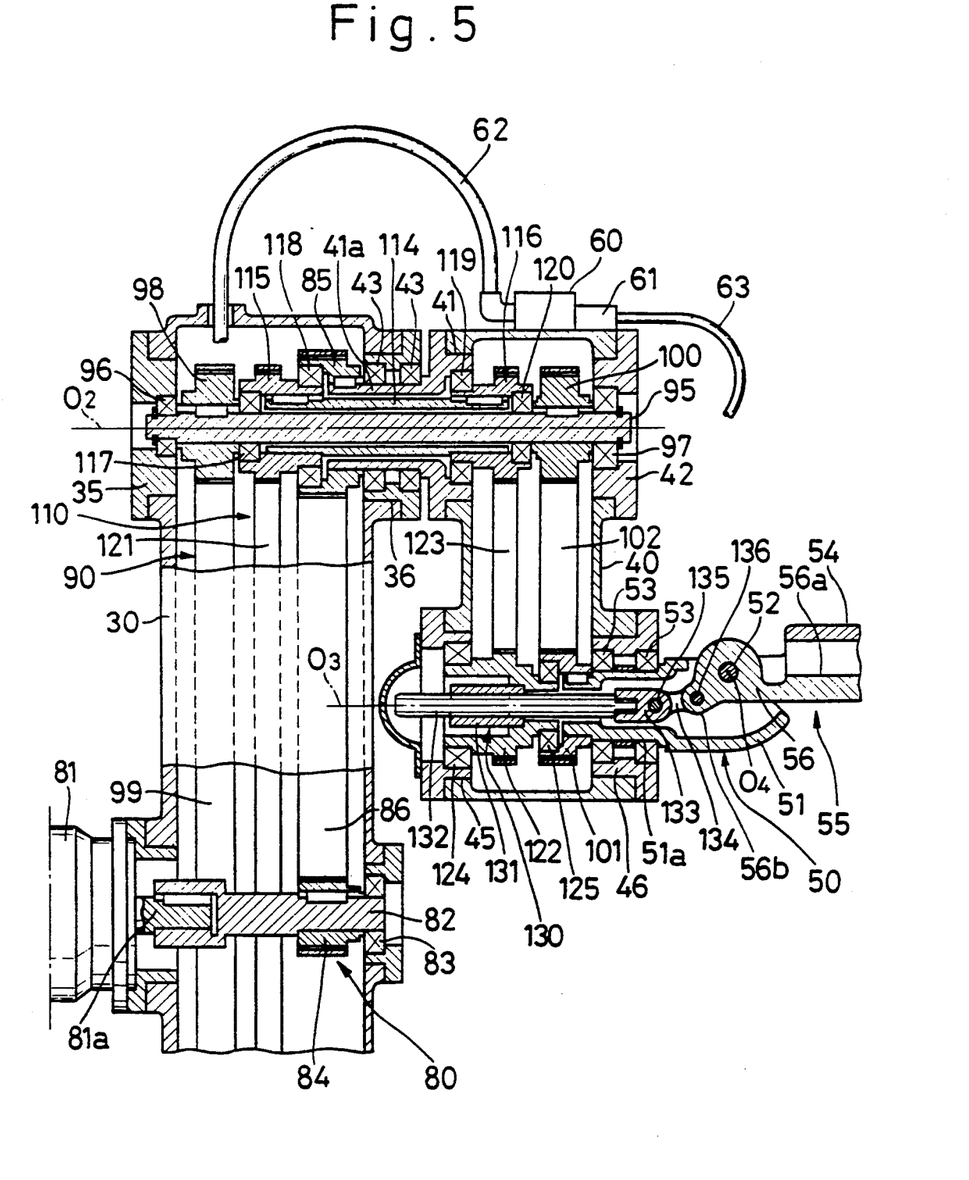
FIG. 5 is a view similar to FIG. 4, but showing a portion of the workpiece transfer apparatus on an enlarged scale.

As best shown in FIG. 5, the timing pulley 122 is connected to the suction device 55 of the holder mechanism 50 via a ball thread mechanism 130. The ball thread mechanism 130 comprises a nut 131 fixedly secured to the inner periphery of the timing pulley 122, and a threaded rod 132 threadedly engaged with the nut 131. A connecting member 133 is fixedly secured to one end of the threaded rod 132. The nut 131, the threaded rod 132 and the connecting member 133 are disposed on the third angular movement axis 03. A link 134 is pivotally connected at one end to the connecting member 133 by a pin 135, and the other end of the link 134 is pivotally connected by a pin 136 to a projection 56b formed on the proximal end of the frame 56 of the suction device 55. The two pins 135 and 135 extend perpendicular to the third angular movement axis 03, and are parallel to the fourth angular movement axis 04. The pin 136 is disposed below the pin 52 and above the pin 135.

As is clear from the foregoing, the power transmitting means 110 comprises the auxiliary transmitting shaft 111, the third transmitting shaft 114, the timing pulleys 113, 115, 116 and 122, the timing belts 121 and 123, and the ball thread mechanism 130, and these parts are substantially received within the first and second arms 30 and 40.

Next, the operation of the workpiece transfer apparatus A will now be described. The operations of the five servomotors 71 to 75 are automatically controlled according to a predetermined program set by a controller (not shown). Reference is first made to the transfer of the workpiece W which is the simplest operation. In this case, the third, fourth and fifth servomotors 73, 74 and 75 are stopped by their brake mechanisms.

In the operative condition of the pressing machines P1 and P2 in which the workpiece W is subjected to a pressing operation, each of the first and second arms 30 and 40 is disposed in a vertical posture. This condition will hereinafter be referred to as "basic condition".

In the above basic condition, the suction device 55 is disposed horizontally, and the suction pads 59 are directed downward. The lower surfaces of the suction pads 59 are disposed at a level higher than the workpieces W placed on the lower dies 3 of the pressing machines P1 and P2.

During the time when the first and second arms 30 and 40 are driven respectively by the first and second servomotors 71 and 72 to be angularly moved, the third servomotor 73 is stopped, and therefore the suction device 55 is kept in a horizontal condition, thus maintaining the workpiece W in a horizontal condition. The reason for this is that since the timing pulleys 94 and 98, as well as the timing pulleys 100 and 101, have the same number of teeth, the support member 51 of the holder mechanism 50 is angularly moved relative to the second arm 40 in a direction opposite to the direction of angular movement of the second arm 40, through an angle equal to the difference between the angle of angular movement of the second arm 40 relative to the first arm 30 and the angle of angular movement of the first ar 30 relative to the vertical line.

Immediately after the pressing machines P1 and P2 finish their pressing operations, the first arm 30 is angularly moved in a counterclockwise direction (FIG. 1) from the above basic condition, and at the same time the second arm 40 is angularly moved in the opposite direction (i.e., clockwise direction), so that the suction device 55 is moved toward the pressing machine P1. The amount of horizontal movement of the suction device 55 is determined by the sum of the amounts of angular movement of the first arm 30 and the second arm 40, and therefore can be increased, and also the speed of this horizontal movement can be increased.

In order that the suction device 55 can be inserted into a relatively narrow space between the upper die 137 and the lower die 3 of the pressing machine P1, it is preferred that the suction device 55 should be moved substantially horizontally and should not be moved vertically (i.e., in an upward/downward direction). The manner of angular movement of the first and second arms 30 and 40 meet this requirement. The reason for this is that upon counterclockwise angular movement of the first arm 30, the second angular movement axis 02 descends from its original position (The amount of this descending is here represented by V1) whereas upon clockwise angular movement of the second arm 40, the suction device 55 ascends relative to the second angular movement axis 02 (The amount of this ascending is represented by V2).

More specifically, the absolute value of the vertical (upward/downward) movement occurring upon horizontal movement of the suction device 55 is determined by the difference between the descending amount V1 and the ascending amount V2. Here, the following formulas are established:

$$V1 = L1 \cdot (1 - \cos X)$$

$$V2 = L2 \cdot (1 - \cos Y)$$

where L1 represents the effective length of the first arm 30, L2 represents the effective length of the second arm 40, X represents the angle of the first arm 30 relative to the vertical line, and Y represents the angle of the second arm 40 relative to the vertical line.

Figure 6:
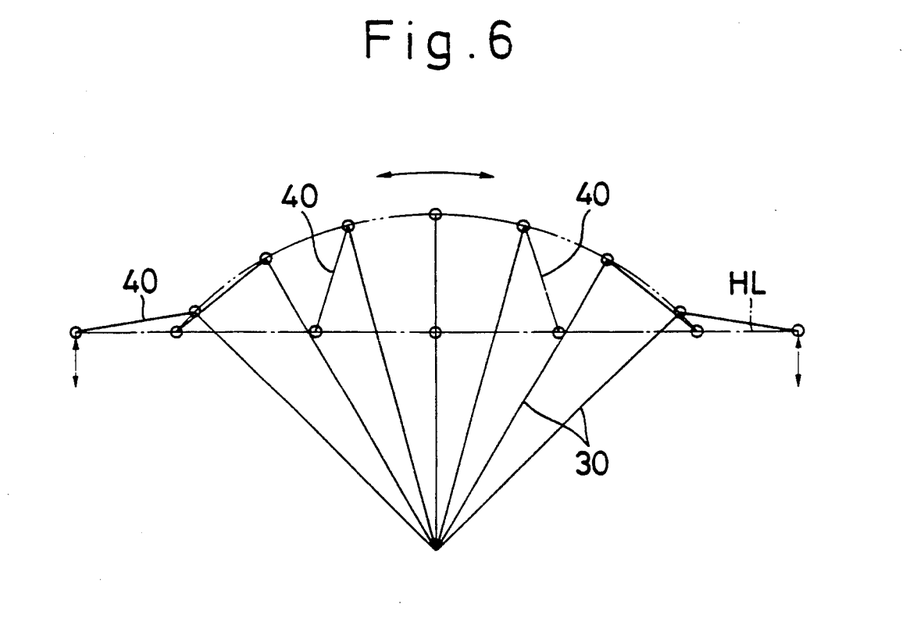
FIG. 6 is a diagrammatical illustration showing the manner of angular movement of first and second arms of the workpiece transfer apparatus when a workpiece is moved horizontally.

Therefore, by satisfying the following formula, the descending amount V1 is made equal to the ascending amount V2, so that the suction device 55 depicts a completely horizontal locus HL shown in FIG. 6.

$$L1 \cdot (1 - \cos X) = L2 \cdot (1 - \cos Y) \tag{1}$$

Figure 7:
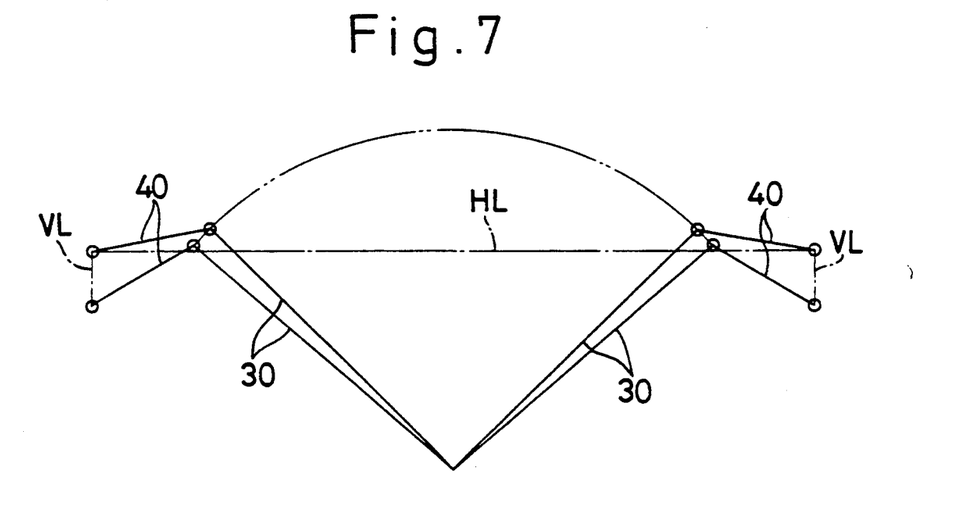
FIG. 7 is a diagrammatical illustration showing the manner of angular movement of the first and second arms when the workpiece is moved vertically.

When the suction device 55 is moved to the position just above the workpiece W placed on the lower die 3 of the pressing machine P1, the first arm 30 is further angularly moved in a counterclockwise direction, and at the same time the second arm 40 is angularly moved in a counterclockwise direction in contrast with the direction of angular movement thereof during the above horizontal movement of the suction device 55. At this time, the amount of descending of the suction device 55 from one end of the horizontal locus HL is determined by the sum of the amount of descending of the second angular movement axis 02 (due to the angular movement of the first arm 30) and the amount of descending of the suction device 55 (due to the angular movement of the second arm 40) relative to the second angular movement axis 02. At this time, the second angular movement axis 02 is displaced to the left due to the angular movement of the first arm 30, and the suction device 55 is displaced to the right relative to the second angular movement axis 02 due to the angular movement of the second arm 40, and therefore by causing these horizontal movement amounts to cancel each other (in other words, by satisfying the following formula), the suction device 55 depicts a completely vertical locus VL shown in FIG. 7.

$$L1 \cdot (\sin X - \sin X') = -L2 \cdot (\sin Y - \sin Y') \tag{2}$$

where X' and Y' respectively represent the angles of the first and second arms 30 and 40 relative to the vertical line when the suction device 5 reaches one end of the horizontal locus HL.

The horizontal movement and the vertical movement of the suction device 55 can be effected continuously. Alternatively, after the horizontal movement is stopped, the vertical movement is effected.

When the suction pads 59 of the suction device 55 are positively brought into contact with the workpiece W, the change valve 61 is operated to create vacuum in the suction pads 59, thereby causing the suction pads 59 to hold the workpiece W by suction.

As described above, since the suction pads 59 approach vertically toward the workpiece W and are brought into contact therewith to hold it, the suction pads 59 can hold the workpiece W at the proper position.

Then, the first arm 30 and the second arm 40 are angularly moved in a clockwise direction so as to satisfy the above formula (2), thereby ascending the suction device 55 along the vertical locus VL.

Then, when the suction device 55 reaches the one end of the horizontal locus HL, the first arm 30 is angularly moved in a clockwise direction so as to satisfy the above formula (1), and the second arm 40 is angularly moved in a counterclockwise direction. As a result, the suction device 55 and the workpiece W are moved toward the pressing machine P2. At this time, since the workpiece W is not moved vertically, the workpiece W can be moved or transferred in a stable manner.

When the workpiece W is horizontally transferred from the pressing machine P1 toward the pressing machine P2, the holder mechanism 50 including the suction device 55 passes across the first arm 30, but does not interfere therewith, because the holder mechanism 50 is arranged on that side of the second arm 40 facing away from the first arm 30. Such arrangement of the holder mechanism 50 means that the first arm 30 can be longer than the second arm 40, thereby increasing the distance of transfer of the workpiece W.

When the workpiece W is moved from the pressing machine P1 to the position just above the lower die 3 of the pressing machine P2, another workpiece W processed by the pressing machine P2 has already been transferred by another workpiece transfer apparatus (not shown) to a pressing machine disposed on the opposite side of the pressing machine P1.

When the workpiece W is positioned just above the lower die 3 of the pressing machine P2, the first arm 30 is angularly moved in a clockwise direction, and the second arm 40 is also angularly moved in a clockwise direction, thereby descending the workpiece W along the vertical locus VL. Then, when the workpiece W is brought into contact with the lower die 3 of the pressing machine P2, the first and second arms 30 and 40 are stopped, and also the change valve 61 is switched, so that the suction pads 59 are caused to be open to the atmosphere, thereby releasing the holding of the workpiece W. As a result, the workpiece W is supported on the lower die 3.

Thereafter, the first and second arms 30 and 40 are angularly moved in directions reverse to the above-mentioned directions to thereby ascend the suction device 55, and further the first arm 30 is angularly moved in a counterclockwise direction, with the second arm 40 angularly moved in a clockwise direction, thereby returning these two arms 30 and 40 to the basic condition. At this time, the suction device 55 is moved along the horizontal locus HL to be returned to the original position. Thus, the workpiece transfer apparatus is prepared for transferring a subsequent workpiece W.

As described above, by controlling the angular movements of the two arms 30 and 40, the suction device 55 can be moved horizontally and vertically. In addition, since the suction device 55 is projected from the second arm 40 in a direction perpendicular to the direction of the horizontal transfer, the second arm 40 is not introduced into the space between the upper die 137 and the lower die 3 when the suction device 55 is inserted into this space. Therefore, this space between the upper and lower dies can be small.

In the workpiece transfer apparatus A of the above construction, the workpiece W removed from the pressing machine P1 can be inverted and supplied to the other pressing machine P2. In this case, during the horizontal movement of the workpiece W from the pressing machine P1 to the pressing machine P2, the third servomotor 73 is operated to angularly move the support member 51 through 180° to invert the same. In this case, it is necessary that the lower die 3 of the pressing machine P2 should have a recess for receiving the suction device 55.

In the case where the lower die 3 of the pressing machine P1 is disposed horizontally whereas the lower die 3 of the other pressing machine P2 is inclined relative to a horizontal plane, the fourth servomotor 74 is operated, during the horizontal movement of the workpiece W from the pressing machine P1 to the pressing machine P2, to rotate the timing pulley 122, provided at the lower end portion of the second arm, together with the nut 131 fixedly secured to this timing pulley 122. As a result, the threaded rod 132 is moved axially, and this axial movement is converted via the link 134 into the angular movement (inclination) of the suction device 55 about the fourth angular movement axis 04. In this manner, the workpiece W can be set on the inclined lower die 3. Also, the suction device 55 can be inclined by driving the third servomotor 73, in which case the suction device 55 is angularly moved about the third angular movement axis 03. Further, by driving the third and fourth servomotors 73 and 74 simultaneously, the suction device 55 can be inclined in any direction.

When the lower dies 3 of the pressing machines P1 and P2 are displaced from each other in the forward/backward direction perpendicular to the direction of the above horizontal transfer, the base 20 is moved by the fifth servomotor 75 in the forward/backward direction during the above horizontal transfer.

The above workpiece transfer apparatus A is disposed between the two pressing machines P1 and P2, and is not confronted with the fronts of the two pressing machines P1 and P2. Thus, a large space is available in front of the two pressing machines. This facilitates the exchanging of the dies, and other operations.

The present invention is not to be restricted to the above embodiment, and various modifications can be made without departing from the spirits of the invention. For example, the workpiece W may be held by an electromagnet or may be grasped by a mechanical grasping mechanism. All of the servomotors may be mounted on the base.

What is claimed is:

1. A pressing system comprising at least two pressing machines juxtaposed along a line and a workpiece transfer apparatus disposed between the two adjacent pressing machines, the front of said workpiece transfer apparatus being directed toward the fronts of the two pressing machines; said workpiece transfer apparatus comprising:
    (a) a base;
    (b) a first arm mounted at a lower end thereof on said base for angular movement about a first angular movement axis, said first angular movement axis extending substantially horizontally and perpendicular to said line along which said pressing machines are juxtaposed;
    (c) a second arm mounted at an upper end thereof on an upper end of said first arm for angular movement about a second angular movement axis, said second angular movement axis being parallel to said first angular movement axis, an effective length of said first arm between said first and second angular movement axes being greater than an effective length of said second arm between said second angular movement axis and a third angular movement axis, said third angular movement axis being parallel to said first and second angular movement axes;
    (d) holder means for releasably holding a workpiece, said holder means being mounted on a lower end of said second arm for angular movement about said third angular movement axis, said holder means being projected forwardly from a front surface of said second arm in the direction of said third angular movement axis, said front surface of said second arm being spaced from said first arm;
    (e) first and second drive means for angularly moving said first and second arms, respectively, said first and second drive means being mounted on said base and said first arm, respectively, said first and second drive means selectively angularly moving said first and second arms with opposite rotations, respectively, so that said holder means is moved horizontally along a substantially horizontal locus, said first and second drive means alternately selectively angularly moving said first and second arms, respectively, with the said rotation, when said holder means is positioned at each of opposite ends of said horizontal locus, thereby moving said holder means downward vertically along a substantially vertical locus, said horizontal locus of said holder means being disposed between said two pressing machine, and said vertical locus of said holder means being disposed above a lower die of each of said pressing machines;
    (f) first power transmitting means operatively connecting said first drive means to said lower end of said first arm; and (g) second power transmitting means operatively connecting said second drive means to said upper end of said second arm;

(h) third drive means mounted on said base for angularly moving said holder means;

(i) third power transmitting means operatively connecting said third drive means to said holder means, said holder means comprising a support member and a suction device, said support member being mounted on the lower end of said second arm for angular movement about said third movement axis, said support being operatively connected though said third power transmitting means to said third drive means, said support member having a projecting end projecting from said front surface of said second arm in a direction away from said first arm, said suction device being mounted on said projecting end for angular movement about a fourth angular movement axis, said fourth angular movement axis being disposed substantially horizontally and perpendicular to said third angular movement axis;

(j) fourth drive means mounted on said base for angularly moving said suction device; and (k) fourth power transmitting means operatively connecting said fourth drive means to said suction device.

2. Pressing system according to claim 1, in which said first and second arms are hollow, said first, second, third and fourth drive means comprising first, second, third and fourth servomotors, respectively, said second power transmitting means being received in said first arm, said third power transmitting means being received in said first and second arms, and said fourth power transmitting means being received in said first and second arms.

3. Pressing system according to claim 2, in which said support member of said holder means has a tubular shape, said fourth power transmitting means including a thread mechanism provided at the lower end of said second arm, and said thread mechanism comprising a nut rotatably housed in the lower end of said second arm, and a threaded rod threadedly engaged with said nut and extending into said support member, and a link having opposite ends pivotally connected respectively to said threaded rod and said suction device.

4. Pressing system according to claim 3, in which a first transmitting shaft of a tubular shape is fixedly secured to the upper end of said second arm, and extends along said second angular movement axis, said first transmitting shaft being angularly movably supported on the upper end of said first arm, a second transmitting shaft extending coaxially through said first transmitting shaft with a gap therebetween, a third transmitting shaft of a tubular shape being interposed coaxially between said first and second transmitting shafts, one ends of said first, second and third transmitting shafts being received in the upper end of said first arm, the other ends of said second and third transmitting shafts being received in the upper end of said second arm, said second power transmitting means including said first transmitting shaft, and a belt connecting said second servomotor to the one end of said first transmitting shaft, said third power transmitting means including said second transmitting shaft, a belt connecting said third servomotor to the one end of said second transmitting shaft, and a belt connecting the other end of said second transmitting shaft to said support member; said fourth transmitting means including said thread mechanism, said third transmitting shaft, a belt connecting said fourth servomotor to the one end of said third transmitting shaft, and a belt connecting the other end of said third transmitting shaft to said nut of said thread mechanism.

5. Pressing system according to claim 1, further comprising a bed fixedly mounted on a floor, guide means provided on an upper surface of said bed and supporting said base in such a manner that said base is movable along said first angular movement axis, and fifth drive means for moving said base.

6. Pressing system according to claim 1, in which said effective length of first arm is more than twice greater than said effective length of the second arms.

7. A workpiece transfer apparatus comprising:

(a) a base;

(b) a first arm mounted at a lower end thereof on said base for angular movement about a first angular movement axis extending substantially horizontally;

(c) a second arm mounted at an upper end thereof on an upper end of said first arm for angular movement about a second angular movement axis, said second angular movement axis being parallel to said first angular movement axis, an effective length of said first arm between said first and second angular movement axes being greater than an effective length of said second arm between said second angular movement axis and a third angular movement axis, said third angular movement axis being parallel to said first and second angular movement axes;

(d) holder means for releasably holding a workpiece, said holder means being mounted on a lower end of said second arm for angular movement about said third angular movement axis, said holder means being projected forwardly from a front surface of said second arm in the direction of said third angular movement axis, said front surface of said second arm being spaced from said first arm;

(e) first, second and third drive means for angularly moving said first arm, said second arm, and said holder means, respectively, said first and third drive means being mounted on said base, and said second drive means being mounted on said first arm, said first and second drive means selectively angularly moving said first and second arms with opposite rotations, respectively, so that said holder means is moved horizontally along a substantially horizontal locus, said first and second drive means alternately selectively angularly moving said first and second arms, respectively, with the same rotation, when said holder means is positioned at each of opposite ends of said horizontal locus, thereby moving said holder means downward vertically along a substantially vertical locus;

(f) first power transmitting means operatively connecting said first drive means to said lower end of said first arm;

(g) second power transmitting means operatively connecting said second drive means to said upper end of said second arm; and (h) third power transmitting means operatively connecting said third drive means to said holder means;

wherein said holder means comprises a support member and a suction device, said support member being mounted on the lower end of said second arm for angular movement about said third angular movement axis, said support member being operatively connected through said third power transmitting means to said third drive means, said support member having a projecting end projecting from said front surface of said second arm in a direction away from said first arm, said suction device being mounted on said projecting end for angular movement about a fourth angular movement axis, said fourth angular movement axis being disposed substantially horizontally and perpendicular to said third angular movement axis, and there being provided fourth drive means for angularly moving said suction device and fourth power transmitting means operatively connecting said fourth drive means to said suction device, said fourth drive means mounted on said base; and wherein said first and second arms are hollow, said first to fourth drive means respectively comprising first and fourth servomotors, said second power transmitting means being received in said first arm, said third power transmitting means being received in said first and second arms, and said fourth power transmitting means being received in said first and second arms.

* * * * *

UNITED STATES PATENT AND TRADEMARK OFFICE
CERTIFICATE OF CORRECTION

PATENT NO.   : 5,106,258

DATED        : April 21, 1992

INVENTOR(S)  : Masaru ORII

It is certified that error appears in the above-identified patent and that said Letters Patent is hereby corrected as shown below:

Column 12:

In claim 1, subparagraph (e), line 11, replace "with the said rotation" with --with the same rotation--.

In claim 1, subparagraph (i), line 7, replace "said support" with --said support member--.

Signed and Sealed this

Seventeenth Day of August, 1993

Attest:

BRUCE LEHMAN

Attesting Officer

Commissioner of Patents and Trademarks